US012803696B2

(12) United States Patent
Husbands et al.

(10) Patent No.: US 12,803,696 B2
(45) Date of Patent: Nov. 17, 2026

(54) BALANCED OPTICAL COMMUNICATION NETWORKS

(71) Applicant: Lightmatter, Inc., Boston, MA (US)

(72) Inventors: Parry Jones Reginald Husbands, Waltham, MA (US); Gongyu Wang, Newton, MA (US); Ayon Basumalik, Framingham, MA (US); Darius Bunandar, Boston, MA (US)

(73) Assignee: Lightmatter, Inc., Mountain View, CA (US)

( * ) Notice: Subject to any disclaimer, the term of this patent is extended or adjusted under 35 U.S.C. 154(b) by 218 days.

(21) Appl. No.: 18/798,940

(22) Filed: Aug. 9, 2024

(65) Prior Publication Data

US 2025/0055589 A1 Feb. 13, 2025

Related U.S. Application Data

(60) Provisional application No. 63/519,170, filed on Aug. 11, 2023.

(51) Int. Cl.
*H04J 14/02* (2006.01)
*H04B 10/80* (2013.01)
*H04Q 11/00* (2006.01)

(52) U.S. Cl.
CPC ........ *H04J 14/0216* (2013.01); *H04B 10/801* (2013.01); *H04Q 11/0005* (2013.01); *H04Q 2011/006* (2013.01)

(58) Field of Classification Search
CPC ............... H04J 14/0216; H04B 10/804; H04Q 11/0005; H04Q 2011/006
(Continued)

(56) References Cited

U.S. PATENT DOCUMENTS

| | | | |
|---|---|---|---|
| 6,202,165 | B1 | 3/2001 | Pine |
| 7,251,386 | B1 | 7/2007 | Dickinson et al. |

(Continued)

FOREIGN PATENT DOCUMENTS

| | | | |
|---|---|---|---|
| EP | 2 212 887 B1 | 4/2013 | |
| EP | 3 159 721 A1 | 4/2017 | |
| WO | WO 2016/008771 A1 | 1/2016 | |

OTHER PUBLICATIONS

Beausoleil et al., Nanoelectronic and Nanophotonic Interconnect. Proceedings of the IEEE, vol. 96, No. 2, pp. 230-247, Feb. 2008, doi: 10.1109/JPROC.2007.911057. (Year: 2008).

(Continued)

*Primary Examiner* — Dalzid E Singh
(74) *Attorney, Agent, or Firm* — Wolf, Greenfield & Sacks, P.C.

(57) ABSTRACT

Described herein are balanced, bidirectional, optical communication networks. These networks may be used in large-scale settings, including in networks including more than one hundred nodes or more than one thousands nodes. A network may include a plurality of nodes. Each node comprises a plurality of optical transceivers of a first type and a plurality of optical transceivers of a second type. The types differ from each other in a characteristic of light transmitted by the respective optical transceiver. The optical transceivers of the first type are in equal numbers across the plurality of nodes and the optical transceivers of the second type are also in equal numbers across the plurality of nodes. A plurality of optical channels connect the nodes with one another by coupling optical transceivers of the first type with optical transceivers of the second type. The optical channel support bidirectional communication between the connected nodes.

20 Claims, 7 Drawing Sheets

(58) Field of Classification Search
USPC .......................................................... 398/204
See application file for complete search history.

(56) References Cited

U.S. PATENT DOCUMENTS

| | | | | |
|---|---|---|---|---|
| 8,121,478 | B2 * | 2/2012 | Kash | H04Q 11/0005 398/56 |
| 9,225,454 | B1 * | 12/2015 | Liu | H04J 14/0305 |
| 9,332,323 | B2 * | 5/2016 | Zhang | H04J 14/0205 |
| 9,712,239 | B2 * | 7/2017 | Murshid | H04J 14/0223 |
| 9,922,887 | B2 | 3/2018 | Vermeulen et al. | |
| 10,230,468 | B2 * | 3/2019 | Mansouri Rad | H04J 14/04 |
| 11,367,711 | B2 | 6/2022 | Harris et al. | |
| 2008/0044128 | A1 | 2/2008 | Kish, Jr. et al. | |
| 2008/0089640 | A1 | 4/2008 | Beausoleil | |
| 2011/0065390 | A1 | 3/2011 | Asplund et al. | |
| 2011/0073989 | A1 | 3/2011 | Rong et al. | |
| 2011/0128790 | A1 | 6/2011 | Sarin et al. | |
| 2012/0149148 | A1 | 6/2012 | Dallesasse et al. | |
| 2012/0177381 | A1 | 7/2012 | Dobbelaere et al. | |
| 2013/0051725 | A1 | 2/2013 | Shinoda et al. | |
| 2013/0071121 | A1 | 3/2013 | Sharapov et al. | |
| 2013/0209112 | A1 | 8/2013 | Witzens | |
| 2013/0292840 | A1 | 11/2013 | Shoemaker et al. | |
| 2013/0308893 | A1 | 11/2013 | Zuffada et al. | |
| 2014/0040698 | A1 | 2/2014 | Loh et al. | |
| 2014/0043050 | A1 | 2/2014 | Stone et al. | |
| 2014/0264400 | A1 | 9/2014 | Lipson et al. | |
| 2014/0300008 | A1 | 10/2014 | Duan et al. | |
| 2014/0363124 | A1 | 12/2014 | Pelley et al. | |
| 2016/0181322 | A1 | 6/2016 | Mazed et al. | |
| 2016/0191188 | A1 | 6/2016 | Butler | |
| 2017/0160474 | A1 | 6/2017 | Mahmoodian et al. | |
| 2019/0140761 | A1 * | 5/2019 | Chan | H04J 14/0226 |
| 2019/0162901 | A1 | 5/2019 | Yu et al. | |
| 2019/0335252 | A1 | 10/2019 | Ryan | |
| 2019/0356394 | A1 * | 11/2019 | Bunandar | G02F 1/21 |
| 2020/0284981 | A1 | 9/2020 | Harris et al. | |

OTHER PUBLICATIONS

Fujikata et al., LSI on-chip optical interconnection with Si nanophotonics. Extended Abstracts of the 2007 International Conference on Solid State Devices and Materials. 2007. pp. 276-277.

Grigalunas et al., Tell Me—What Is Wafer Dicing? Eastern States Components, LLC. Sep. 26, 2017. 2 pages. URL:https://www.escomponents.com/blog/2017/9/26/tell-me-what-is-wafer-dicing [retrieved Jul. 13, 2020].

Wada, Electronics and Photonics Convergence on Si CMOS Platform. Proc. of SPIE. 2004;5357:16-24.

Young et al., Optical technology for energy efficient I/O in high performance computing. IEEE Communications Magazine vol. 48, No. 10, pp. 184-191, Oct. 2010, doi: 10.1109/MCOM.2010.5594695. (Year: 2010).

International Search Report and Written Opinion dated Nov. 26, 2024, in connection with International Application No. PCT/US2024/041614.

Christoforos et al., A Survey on Optical Interconnects for Data Centers. IEEE Communications Surveys & Tutorials. Oct. 1, 2012;14(4):1021-36.

* cited by examiner

BALANCED OPTICAL COMMUNICATION NETWORKS

CROSS-REFERENCE TO RELATED APPLICATION

This application claims the benefit under 35 U.S.C. § 119(e) of U.S. Provisional Patent Application Ser. No. 63/519,170, filed Aug. 11, 2024, and entitled "PROGRAMMING BIDIRECTIONAL FIBER COMMUNICATION NETWORK," which is hereby incorporated herein by reference in its entirety.

BACKGROUND

Optical interconnects are a type of communication technology that use light signals to transmit data between different components or devices within a system. These interconnects replace traditional electrical connections, such as copper wires or traces on a circuit board, with optical fibers or waveguides. In optical interconnects, data is converted into light signals using optical transmitters, typically lasers or light-emitting diodes (LEDs). These light signals travel through optical fibers or waveguides, which are made of materials that can efficiently guide and transmit light with minimal loss. At the receiving end, optical receivers convert the incoming light signals back into electrical signals that can be processed by electronic devices.

BRIEF SUMMARY

Some embodiments relate to an optical network, comprising a plurality of nodes, wherein each node of the plurality of nodes comprises a plurality of optical transceivers of a first type and a plurality of optical transceivers of a second type, wherein the first type differs from the second type in at least one characteristic of light transmitted by the respective optical transceiver, wherein the optical transceivers of the first type are in equal numbers across the plurality of nodes and the optical transceivers of the second type are in equal numbers across the plurality of nodes; and a plurality of optical channels connecting the plurality of nodes with one another by coupling optical transceivers of the first type with optical transceivers of the second type, wherein the plurality of optical channels support bidirectional communication between the connected nodes.

In some embodiments, if the nodes comprise an even number of optical transceivers, the number of optical transceivers of the first type at each node equals the number of optical transceivers of the second type at each node, and if the nodes comprise an odd number of optical transceivers, the number of optical transceivers of the first type at each node equals the number of optical transceivers of the second type at each node minus one.

In some embodiments, the plurality of optical channels connect the plurality of nodes with one another in an all-to-all configuration.

In some embodiments, the plurality of nodes comprises at least one thousand nodes connected with one another in the all-to-all configuration.

In some embodiments, the at least one characteristic by which the first type differs from the second type comprises a wavelength of the light transmitted by the respective optical transceiver such that the plurality of optical transceivers of the first type are configured to transmit light at a first wavelength and the plurality of optical transceivers of the second type are configured to transmit light at a second wavelength.

In some embodiments, the plurality of optical transceivers of the first type are configured to transmit light at a first wavelength division multiplexing (WDM) set and the plurality of optical transceivers of the second type are configured to transmit light at a second WDM set.

In some embodiments, the at least one characteristic by which the first type differs from the second type comprises a polarization of the light transmitted by the respective optical transceiver such that the plurality of optical transceivers of the first type are configured to transmit light with a first polarization and the plurality of optical transceivers of the second type are configured to transmit light with a second polarization.

In some embodiments, the at least one characteristic by which the first type differs from the second type comprises a time slot in which the light is transmitted by the respective optical transceiver such that the plurality of optical transceivers of the first type are configured to transmit light in a first time slot and the plurality of optical transceivers of the second type are configured to transmit light in a second time slot.

In some embodiments, the plurality of optical transceivers of each node are integrated on a common photonic integrated circuit (PIC).

In some embodiments, a first node of the plurality of nodes further comprises a first optical source coupled to the optical transceivers of the first type and a second optical source coupled to the optical transceivers of the second type.

Some embodiments relate to an optical network, comprising a plurality of nodes comprising at least one thousand nodes, wherein each node of the plurality of nodes comprises a plurality of optical transceivers of a first type and a plurality of optical transceivers of a second type, wherein the first type differs from the second type in at least one characteristic of light transmitted by the respective optical transceiver, wherein the optical transceivers of the first type are in equal numbers across the plurality of nodes and the optical transceivers of the second type are in equal numbers across the plurality of nodes; and a plurality of optical channels connecting the plurality of nodes with one another in an all-to-all configuration by coupling optical transceivers of the first type with optical transceivers of the second type, wherein the plurality of optical channels support bidirectional communication between the connected nodes, wherein: if the nodes comprise an even number of optical transceivers, the number of optical transceivers of the first type at each node equals the number of optical transceivers of the second type at each node, and if the nodes comprise an odd number of optical transceivers, the number of optical transceivers of the first type at each node equals the number of optical transceivers of the second type at each node minus one.

In some embodiments, the at least one characteristic by which the first type differs from the second type comprises a wavelength of the light transmitted by the respective optical transceiver such that the plurality of optical transceivers of the first type are configured to transmit light at a first wavelength and the plurality of optical transceivers of the second type are configured to transmit light at a second wavelength.

In some embodiments, the plurality of optical transceivers of the first type are configured to transmit light at a first wavelength division multiplexing (WDM) set and the plurality of optical transceivers of the second type are configured to transmit light at a second WDM set.

In some embodiments, the at least one characteristic by which the first type differs from the second type comprises a polarization of the light transmitted by the respective optical transceiver such that the plurality of optical transceivers of the first type are configured to transmit light with a first polarization and the plurality of optical transceivers of the second type are configured to transmit light with a second polarization.

In some embodiments, the at least one characteristic by which the first type differs from the second type comprises a time slot in which the light is transmitted by the respective optical transceiver such that the plurality of optical transceivers of the first type are configured to transmit light in a first time slot and the plurality of optical transceivers of the second type are configured to transmit light in a second time slot.

In some embodiments, the plurality of optical transceivers of each node are integrated on a common photonic integrated circuit (PIC).

In some embodiments, each node is coupled to at least one graphical processing unit (GPU).

Some embodiments relate to a method of forming an optical network, comprising obtaining a plurality of nodes, wherein each node of the plurality of nodes comprises a plurality of optical transceivers of a first type and a plurality of optical transceivers of a second type, wherein the first type differs from the second type in at least one characteristic of light transmitted by the respective optical transceiver, wherein the optical transceivers of the first type are in equal numbers across the plurality of nodes and the optical transceivers of the second type are in equal numbers across the plurality of nodes; and connecting the plurality of nodes with one another with a plurality of optical channels supporting bidirectional communication between the connected nodes, wherein the connecting comprises coupling optical transceivers of the first type with optical transceivers of the second type.

In some embodiments, connecting the plurality of nodes with one another with the plurality of optical channels comprises connecting the plurality of nodes with one another with the plurality of optical channels in an all-to-all configuration.

In some embodiments, the method further comprises connecting each node to a graphical processing unit (GPU).

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

Figure 1:
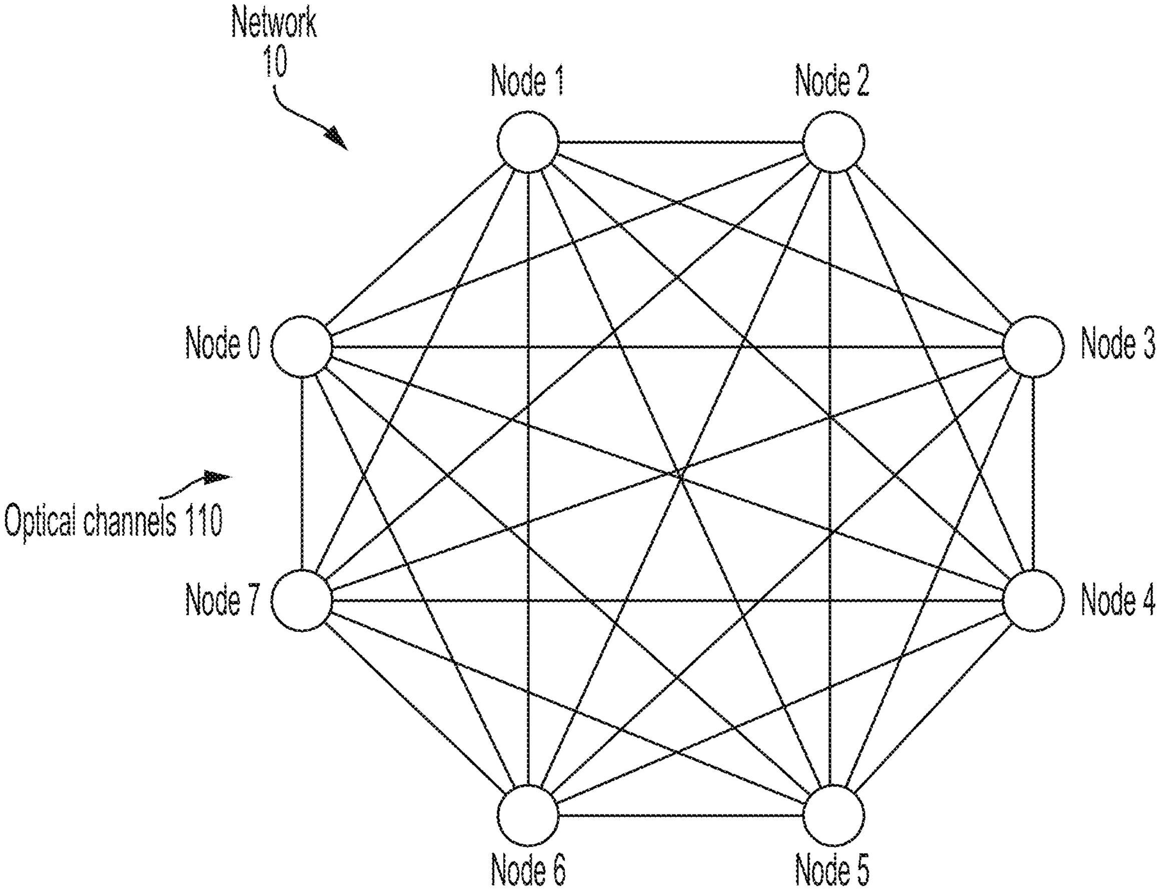
FIG. 1 is a schematic diagram illustrating an optical network arranged in an all-to-all configuration, in accordance with some embodiments.

Described herein are balanced, bidirectional, optical communication networks. The networks developed by the inventors and described herein may be used in large-scale settings, including in networks including more than one hundred nodes or more than one thousands nodes. For example, these optical networks may be used in data centers to facilitate communication among large number of computational units, such as graphical processing units (GPU).

Optical fibers are widely used for networking within data centers to connect different servers, racks, and data center regions due to their high bandwidth and long-distance capabilities. These connections support data transfer between GPUs located in different physical locations within the data center. However, GPUs in data centers are typically connected using high-speed electrical connections such as PCIe (Peripheral Component Interconnect Express) and NVLink. Optical fiber connections are not commonly used directly for GPU-to-GPU communication within a single server or chassis at least due to the following reasons. First, optical fibers are generally more expensive than traditional copper cables. Second, using optical fibers requires additional components such as transceivers, which further add complexity and cost. Third, conventional all-to-all optical networks require that each transceiver employ lasers configured to transmit at several different wavelengths, typically one wavelength for each node to which a given node is connected.

The optical networks described herein overcome at least some of the limitations noted above using transceivers having characteristics that are balanced across the nodes of the network. In a network having nodes that include optical transceivers of a first type and optical transceivers of a second type, the optical transceivers of the first type may be in equal numbers across the nodes and the optical transceivers of the second type may also be in equal numbers across the nodes. For example, in an all-to-all network having eight nodes in which each node is to be connected to seven other nodes, each node may include four optical transceivers of the first type and three optical transceivers of the second type. In another example, in an all-to-all network having nine nodes in which each node is to be connected to eight other nodes, each node may include four optical transceivers of the first type and four optical transceivers of the second type. The inventors have recognized and appreciated that designing the network so that each transceiver includes the same number of transceivers of a particular type significantly reduces the number of wavelengths necessary to support all-to-all communication among the nodes. Further, designing optical networks to include optical transceivers of types that repeat within a node leads to a significant advantage over conventional schemes-transceivers of the same type can share optical sources. This reduces the number of distinct optical sources necessary to optically power a node, thus reducing manufacturing, installation and maintenance costs.

Types of transceivers may differ from one another in at least one characteristic of the light transmitted by the transceiver. In one example, the characteristic by which the first type differs from the second type is the wavelength of the light. As such, the transceivers of one type are configured to transmit light at a first wavelength (or first wavelength set) and the transceivers of another type are configured to transmit light at a second wavelength (or second wavelength set). In another example, the characteristic by which the first type differs from the second type is the polarization of the light. As such, the transceivers of type are configured to transmit light at a first polarization (e.g., horizontal) and the transceivers of another type are configured to transmit light at a second polarization (e.g., vertical). In yet another example, the characteristic by which the first type differs from the second type is the time slot in which light is transmitted. As such, the transceivers of one type are configured to transmit light in a first time slot and the transceivers of another type are configured to transmit light in a second time slot (e.g., using time domain multiplexing). Diversity of characteristics may be achieved in other ways.

The inventors have further recognized and appreciated that the complexity of the network would be further reduced by allocating types of transceivers uniformly across the nodes. For example, for networks including two types of transceivers, the inventors propose that the number of transceivers of the first type at a particular node be approximately 50% (of the overall number of transceivers) and the number of transceivers of the second type at the same node be also approximately 50%. It should be noted that the split may be exactly 50%-50% for nodes having an even number of transceivers or close to 50% for nodes having an odd number of transceivers (e.g., 50% minus one). Similarly, for nodes including three types of transceivers, the number of transceivers of the first type at a particular node would be approximately 33.3%, the number of transceivers of the second type at the same node be also approximately 33.3%, and the number of transceivers of the third type at the same node be also approximately 33.3%. Allocating types of transceivers uniformly across the nodes increases the scalability of this architecture to networks having several hundreds or thousands of nodes.

FIG. 1 is a schematic diagram illustrating an optical network arranged in an all-to-all configuration, although not all the networks of the types described herein are limited to this configuration, as some of the connections of FIG. 1 may be missing in some embodiments. In an all-to-all configuration, each node of a network (or a subset of a larger network) is connected to every other node with a point-to-point link. Each link may be bidirectional, thus allowing nodes at either end of the link to transmit information. In the example of FIG. 1, network 10 includes eight nodes (node 0, node 1, node 2, node 3, node 4, node 5, node 6 and node 7). Optical channels 110 connect each pair of nodes together. Optical channels 110 may be implemented using fibers or waveguides integrated on a substrate, or using free-space optical channels. It should be noted that networks used for data centers may have nodes in excess of several hundred, thousand or even tens of thousands, at least one for each computational unit (e.g., GPU). In these networks, it is imperative to employ architectures that can be easily scaled without increasing costs and complexity too significantly.

Figure 2:
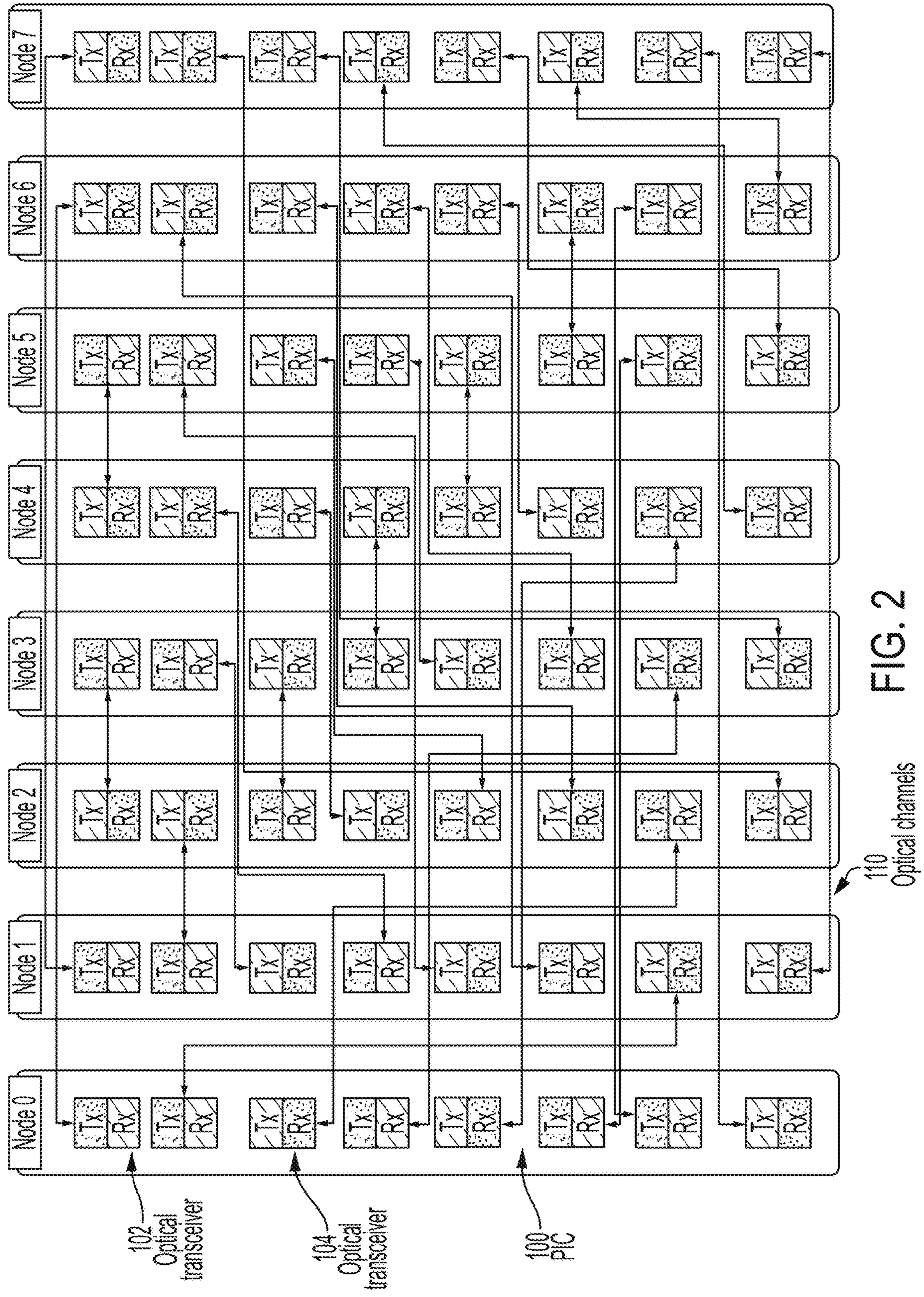
FIG. 2 is a diagram illustrating an implementation of the optical network of FIG. 1, in accordance with some embodiments.

FIG. 2 is a diagram illustrating an implementation of the optical network of FIG. 1. Each column represents one among the eight nodes of FIG. 1. In this example, each node includes eight optical transceivers, four of which are of one type and four are of another type (optical transceivers 102 are of one type and optical transceivers 104 are of another type). It should be noted that the nodes include eight transceivers despite the fact that seven connections per node would be sufficient to form connections to the other nodes. In this example, an additional transceiver has been included in order to allocate types of transceivers more uniformly across the nodes. Absent the eighth transceiver, each node would have four transceivers of one type and only three transceivers of the other type. With the addition of the eighth transceiver, there are four transceivers for each type. The eighth transceiver may remain disconnected, thus serving as a dummy transceiver, or may form a redundant connection. For example, node 0 and node 6 have two distinct points of connection: from the first transceiver of node 0 to the first transceiver of node 6, and from the seventh transceiver of node 0 to the seventh transceiver of node 6.

Because the transceivers are of different types, light transmitted by the transceivers have different characteristics (e.g., different wavelengths or set of wavelengths of transmission, different polarizations or different times of transmission). Transceivers are connected in pairs by optical channels 110. More specifically, each optical channel connects a transceiver of a certain type in a first node to a transceiver of a different type in a second node. For example, the first optical transceiver 102 (from the top) of node 0 is connected to the first optical transceiver 104 (from the top) of node 6. These transceivers are of different types. As another example, the second optical transceiver (from the top) of node 0 is connected to the seventh optical transceiver (from the top) of node 1. As another example, the third optical transceiver (from the top) of node 0 is connected to the seventh optical transceiver (from the top) of node 2. The other connections are readily apparent from the diagram of FIG. 2 and, in the interest of brevity, will not be described.

In some embodiments, the transceivers of a node may be integrated on a common photonic integrated circuit (PIC) 100. A PIC 100 may be implemented using silicon photonics, and may be photolithographically patterned to from multiple photonic devices, such as waveguides, couplers and optical transceivers 102 and 104. Integrating the transceivers on a common substrate reduces manufacturing costs relative to implementations where the transceivers are formed as discrete components, and promotes performance uniformity.

Figure 3:
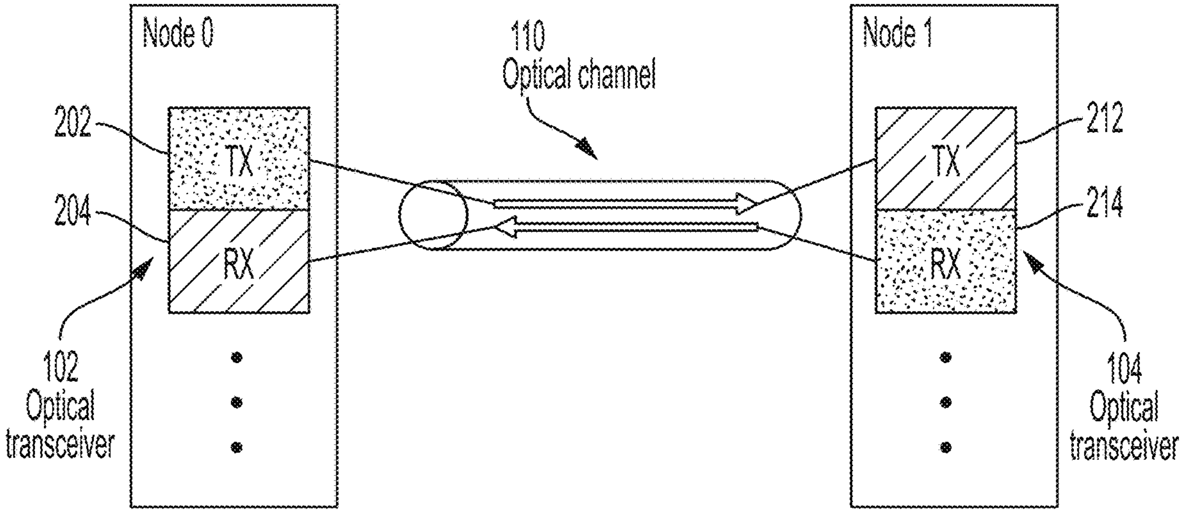
FIG. 3 is a diagram illustrating an optical channel connecting two nodes in the optical network of FIG. 1, in accordance with some embodiments.

FIG. 3 illustrates one of the connections of FIG. 2 in more detail. More specifically, it illustrates the connection between node 0 and node 1, although the other connections have similar arrangements. An optical channel 110 connects a transceiver 102 of node 0 with a transceiver 104 of node 1. As noted above, transceivers 102 and 104 are of different types. Each transceiver 102 includes a transmitter (TX 202) and a receiver (RX 204) and each transceiver 104 includes a transmitter (TX 212) and a receiver (RX 214). A transmitter performs electrical-to-optical conversion by modulating light with a data stream encoded on an electrical signal. As such, transmitters may be implemented using optical modulators, such as Mach Zehnder modulators or microring modulators, although other types of modulators are also possible. A transmitter may further include a digital-to-analog converter and a modulator driver. By contrast, a receiver performs optical-to-electrical conversion by detecting and transforming light encoded with a data stream to an electrical signal. As such, receivers may be implemented using photodetectors configured to produce a photocurrent in response to detection of light. A receiver may further include a transimpedance amplifier and an analog-to-digital converter.

Optical channel 110 supports bidirectional communication, thus allowing node 0 to transmit information to node 1, and vice versa. The ability to support bidirectional communication while preventing signals traveling in opposite directions from interfering with each other is enabled by the fact that the transceivers connected to the optical channel are of different types. As further discussed below in connection with FIGS. 4A-4D, transceivers of different types transmit light with different characteristics. The different characteristics are chosen to prevent interference between light transmitted by a transceiver of one type and light transmitted by a transceiver of a different type. This may be accomplished, among other examples, by using wavelength multiplexing (FIG. 4A), polarization diversity (FIG. 4C) or time division multiplexing (FIG. 4D).

Figure 4A:
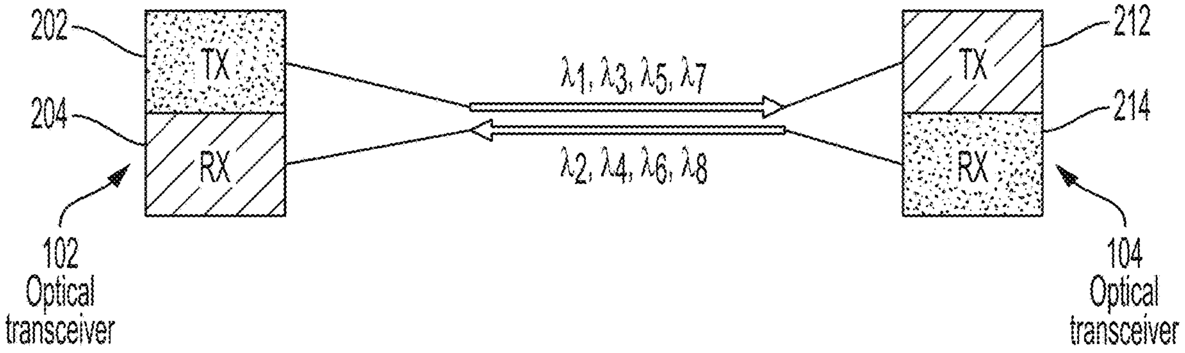
FIG. 4A is a diagram illustrating an optical channel supporting bidirectional communication using different wavelengths, in accordance with some embodiments.

FIG. 4A is a diagram illustrating an optical channel supporting bidirectional communication using different wavelengths. Transceiver 102 is configured to transmit data at wavelengths $\lambda_1$, $\lambda_3$, $\lambda_5$ and $\lambda_7$, while transceiver 104 is configured to transmit data at wavelengths $\lambda_2$, $\lambda_4$, $\lambda_6$ and $\lambda_8$. Because the wavelengths associated with signals traveling on opposite directions are different, light does not interfere. In this example, wavelength division multiplexing (WDM) is used to increase the overall bandwidth of the channel. This is why each transceiver can transmit more than one wavelength (referred to as a WDM set). In other embodiments, WDM may not be used and each transceiver may transmit at a single wavelength only. In some embodiments, transceivers of different types may have lasers configured to emit at different wavelengths in a static (not tunable) fashion. In other embodiments, type diversity may be achieved by tuning tunable lasers appropriately.

Figure 4B:
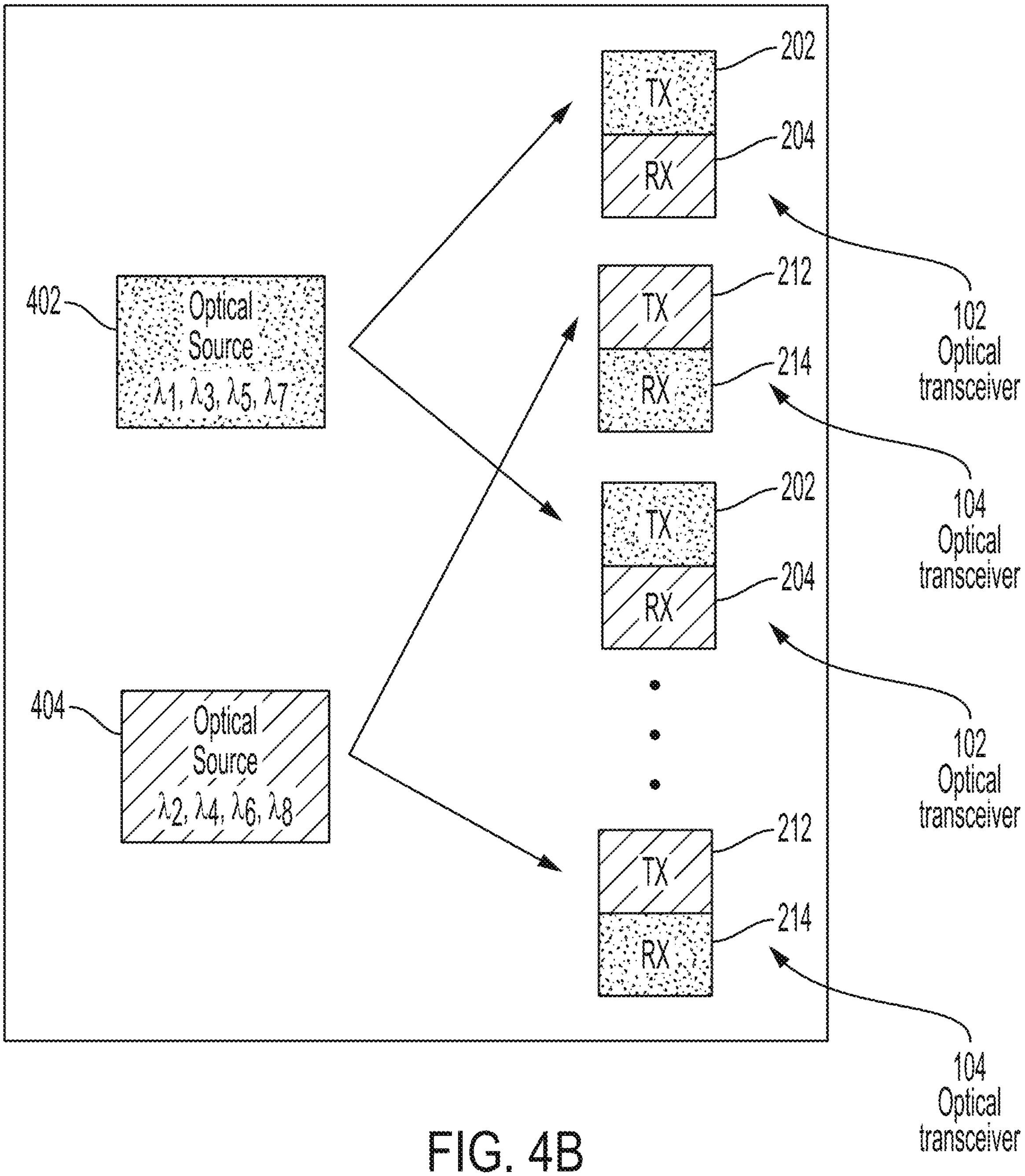
FIG. 4B is a diagram illustrating a node including optical sources shared among optical transceivers, in accordance with some embodiments.

Designing optical networks to include optical transceivers of types that repeat within a node leads to a significant advantage over conventional schemes. As shown in FIG. 4B, transceivers of the same type can share optical sources. This reduces the number of distinct optical sources necessary to optically power a node, thus reducing manufacturing, installation and maintenance costs. In FIG. 4B, an optical source 402 provides light to the transmitters (TX 202) belonging to the transceivers of the first type. Consistent with the example of FIG. 4A, optical source 402 emits light at wavelengths $\lambda_1$, $\lambda_3$, $\lambda_5$ and $\lambda_7$. Notably, the optical source is shared among transceivers 102 (as opposed to having dedicated sources for each transceiver). Light may be routed from source 402 to transceivers 102 using optical couplers and splitters. Optionally, in embodiments in which source 402 does not produce sufficient optical power to sustain all the optical links associated with the transceivers of the first type, optical amplifiers (e.g., semiconductor optical amplifiers) may be used to boost the optical power. Similarly, an optical source 404 provides light to the transmitters (TX 212) belonging to the transceivers of the second type. Consistent with the example of FIG. 4A, optical source 404 emits light at wavelengths $\lambda_2$, $\lambda_4$, $\lambda_6$ and $\lambda_8$. Optical sources 402 and 404 may be implemented using lasers or light emitting diodes.

Figure 4C:
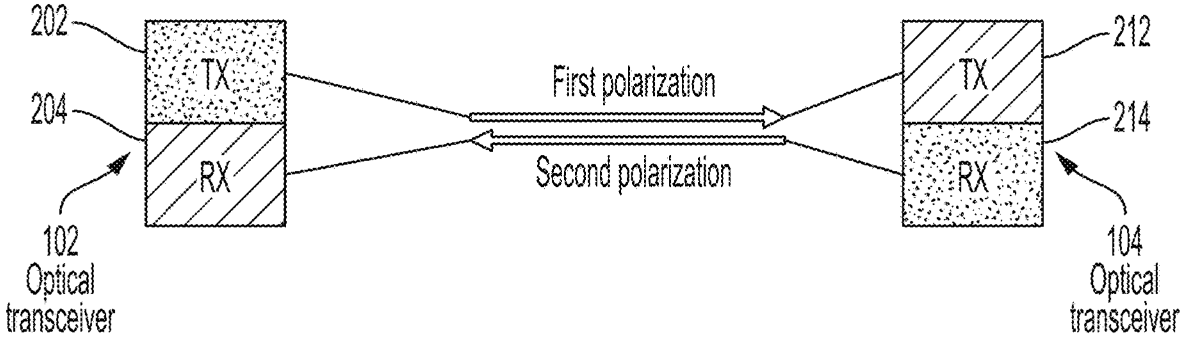
FIG. 4C is a diagram illustrating an optical channel supporting bidirectional communication using different polarizations, in accordance with some embodiments.
Figure 4D:
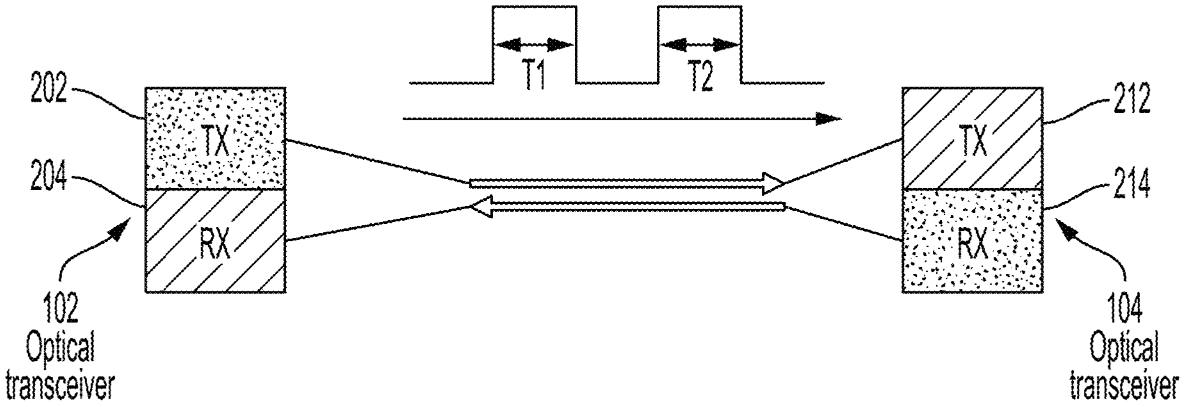
FIG. 4D is a diagram illustrating an optical channel supporting bidirectional communication using time division multiplexing, in accordance with some embodiments.

FIG. 4C is a diagram illustrating an optical channel supporting bidirectional communication using different polarizations. Transceivers of different types transmit light with different polarizations. As such, transceivers of different types may include different types of polarizers. In one example, transceiver 102 transmit light with horizontal polarization (using a horizontal polarizer) and transceiver 104 transmit light with vertical polarization (using a vertical polarizer).

FIG. 4D is a diagram illustrating an optical channel supporting bidirectional communication using time division multiplexing. Here, type diversity is achieved by allowing transceivers 102 and 104 to transmit during different time slots (using time domain multiplexing). In the example of FIG. 4D, transceiver 102 transmits data during time interval T1 and transceiver 104 transmits data during time interval T2. Thus, transceivers of different types may have timing circuits configured to allow transmission of light in accordance with predefined time slots.

Accordingly, some embodiments are directed to an optical network comprising a plurality of nodes and a plurality of optical channels. The nodes comprise a plurality of optical transceivers of a first type (e.g., transceivers 102) and a plurality of optical transceivers of a second type (e.g., transceivers 104). The first type differs from the second type in at least one characteristic of light transmitted by the respective optical transceiver (e.g., wavelength, polarization or time slot of transmission). The optical transceivers of the first type are in equal numbers across the plurality of nodes. In the example of FIG. 2, each node has four transceivers 102. Similarly, the optical transceivers of the second type are in equal numbers across the plurality of nodes. Referring again to the example of FIG. 2, each node has four transceivers 104. The optical channels connect the plurality of nodes with one another by coupling optical transceivers of the first type with optical transceivers of the second type. The optical channel support bidirectional communication between the connected nodes.

If the nodes comprise an even number of optical transceivers, the number of optical transceivers of the first type at each node equals the number of optical transceivers of the second type at each node. Referring back to the example of FIG. 2, where each node has an even number of transceivers, the split between transceivers 102 and transceivers 104 is 50%-50%. However, if the nodes comprise an odd number of optical transceivers, the number of optical transceivers of the first type at each node equals the number of optical transceivers of the second type at each node minus one. For example, if the eighth transceivers were omitted from the nodes of FIG. 2, each node may include three transceivers 104.

The optical channels may connect the plurality of nodes with one another in an all-to-all configuration, although not all embodiments are limited in this respect. In some embodiments, the network may include at least one thousand nodes connected with one another in the all-to-all configuration.

In some embodiments, the characteristic by which the first type differs from the second type may comprise the wavelength of the light transmitted by the respective optical transceiver. As such, the plurality of optical transceivers of the first type are configured to transmit light at a first wavelength (e.g., $\lambda_1$) and the plurality of optical transceivers of the second type are configured to transmit light at a second wavelength (e.g., $\lambda_2$). Alternatively, the plurality of optical transceivers of the first type are configured to transmit light at a first WDM set (e.g., $\lambda_1$, $\lambda_3$, $\lambda_5$ and $\lambda_7$) and the plurality of optical transceivers of the second type are configured to transmit light at a second WDM set (e.g., $\lambda_2$, $\lambda_4$, $\lambda_6$ and $\lambda_8$).

In some embodiments, the characteristic by which the first type differs from the second type comprises the polarization of the light transmitted by the respective optical transceiver. As such, the plurality of optical transceivers of the first type are configured to transmit light with a first polarization (e.g., horizontal) and the plurality of optical transceivers of the second type are configured to transmit light with a second polarization (e.g., vertical).

In some embodiments, the characteristic by which the first type differs from the second type comprises a time slot in which the light is transmitted by the respective optical transceiver. As such, the plurality of optical transceivers of the first type are configured to transmit light in a first time slot (e.g., T1) and the plurality of optical transceivers of the second type are configured to transmit light in a second time slot (e.g., T2).

Further embodiments are directed to a method of forming an optical network comprising obtaining a plurality of nodes and connecting the plurality of nodes with one another with a plurality of optical channels. Each node of the plurality of nodes comprises a plurality of optical transceivers of a first type (e.g., transceivers 102) and a plurality of optical transceivers of a second type (e.g., transceivers 104). The first type differs from the second type in at least one characteristic of light transmitted by the respective optical transceiver. The optical transceivers of the first type are in equal numbers across the plurality of nodes and the optical transceivers of the second type are in equal numbers across the plurality of nodes. The optical channels support bidirectional communication between the connected nodes. Connecting the nodes with the channels comprises coupling optical transceivers of the first type with optical transceivers of the second type. The method may further comprise connecting each node to a graphical processing unit (GPU).

In some embodiments, the solution described above may be obtained by running one of the two following algorithms. In accordance with a first algorithm, let G be a connected multigraph with n nodes, each with k transceivers per node. Each optical channel is an edge in the graph. If there are two types of transceivers as in the example of FIG. 2, each node has k/2 transceivers of the first type and k/2 transceivers of the second type. The types of transceivers are opposite ends of a optical channel are different. In this case, if each node is of even degree, then a solution exists. Each node is of even degree, so an Eulerian cycle (that hits each edge exactly once) exists (Euler's theorem). Each time a node is traversed, a transceiver of the first type is marked and a transceiver of the second type are marked, so every node is balanced (condition 1). The starting node is also balanced because it is the head of the first edge in the cycle and the tail of the last edge in the cycle.

In accordance with a second algorithm, let G be a connected multigraph with n nodes, each with 2 k transceivers. If there are two types of transceivers as in the example of FIG. 2, every graph has n×2×k endpoints. Further, every edge connects 2 endpoints, so there are a total of n×k edges. In this case, a solution exists if n×k is even.

Any solution should be locally balanced (equal number of transceivers of different types), thus any solution should be globally balanced (equal number of red and blue edges). There are n×k endpoints of the first type and n×k endpoints of the second type (k each per node). As a result, there are (n×k)/2 edges of the first type and (n×k)/2 edges of the second type (each edge connects two endpoints). Thus, there are equal numbers edges of different types and even number of edges because n×k is even.

If n×k is even, one can construct an Eulerian cycle (that hits every edge exactly once), using, e.g. Hierholzer's algorithm. There is a solution because every time a node is entered, an edge of one type and an edge of the other type are added, maintaining local balance.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An optical network, comprising:

a plurality of nodes, wherein each node of the plurality of nodes comprises a plurality of optical transceivers of a first type and a plurality of optical transceivers of a second type, wherein the first type differs from the second type in at least one characteristic of light transmitted by the respective optical transceiver, wherein the optical transceivers of the first type are in equal numbers across the plurality of nodes and the optical transceivers of the second type are in equal numbers across the plurality of nodes; and a plurality of optical channels connecting the plurality of nodes with one another by coupling optical transceivers of the first type with optical transceivers of the second type, wherein the plurality of optical channels support bidirectional communication between the connected nodes.

2. The optical network of claim 1, wherein:

if the nodes comprise an even number of optical transceivers, the number of optical transceivers of the first type at each node equals the number of optical transceivers of the second type at each node, and if the nodes comprise an odd number of optical transceivers, the number of optical transceivers of the first type at each node equals the number of optical transceivers of the second type at each node minus one.

3. The optical network of claim 1, wherein the plurality of optical channels connect the plurality of nodes with one another in an all-to-all configuration.

4. The optical network of claim 3, wherein the plurality of nodes comprises at least one thousand nodes connected with one another in the all-to-all configuration.

5. The optical network of claim 1, wherein the at least one characteristic by which the first type differs from the second type comprises a wavelength of the light transmitted by the respective optical transceiver such that the plurality of optical transceivers of the first type are configured to transmit light at a first wavelength and the plurality of optical transceivers of the second type are configured to transmit light at a second wavelength.

6. The optical network of claim 5, wherein the plurality of optical transceivers of the first type are configured to transmit light at a first wavelength division multiplexing (WDM) set and the plurality of optical transceivers of the second type are configured to transmit light at a second WDM set.

7. The optical network of claim 1, wherein the at least one characteristic by which the first type differs from the second type comprises a polarization of the light transmitted by the respective optical transceiver such that the plurality of optical transceivers of the first type are configured to transmit light with a first polarization and the plurality of optical transceivers of the second type are configured to transmit light with a second polarization.

8. The optical network of claim 1, wherein the at least one characteristic by which the first type differs from the second type comprises a time slot in which the light is transmitted by the respective optical transceiver such that the plurality of optical transceivers of the first type are configured to transmit light in a first time slot and the plurality of optical transceivers of the second type are configured to transmit light in a second time slot.

9. The optical network of claim 1, wherein the plurality of optical transceivers of each node are integrated on a common photonic integrated circuit (PIC).

10. The optical network of claim 1, wherein a first node of the plurality of nodes further comprises a first optical source coupled to the optical transceivers of the first type and a second optical source coupled to the optical transceivers of the second type.

11. An optical network, comprising:

a plurality of nodes comprising at least one thousand nodes, wherein each node of the plurality of nodes comprises a plurality of optical transceivers of a first type and a plurality of optical transceivers of a second type, wherein the first type differs from the second type in at least one characteristic of light transmitted by the respective optical transceiver, wherein the optical transceivers of the first type are in equal numbers across the plurality of nodes and the optical transceivers of the second type are in equal numbers across the plurality of nodes; and a plurality of optical channels connecting the plurality of nodes with one another in an all-to-all configuration by coupling optical transceivers of the first type with optical transceivers of the second type, wherein the plurality of optical channels support bidirectional communication between the connected nodes, wherein:

if the nodes comprise an even number of optical transceivers, the number of optical transceivers of the first type at each node equals the number of optical transceivers of the second type at each node, and if the nodes comprise an odd number of optical transceivers, the number of optical transceivers of the first type at each node equals the number of optical transceivers of the second type at each node minus one.

12. The optical network of claim 11, wherein the at least one characteristic by which the first type differs from the second type comprises a wavelength of the light transmitted by the respective optical transceiver such that the plurality of optical transceivers of the first type are configured to transmit light at a first wavelength and the plurality of optical transceivers of the second type are configured to transmit light at a second wavelength.

13. The optical network of claim 12, wherein the plurality of optical transceivers of the first type are configured to transmit light at a first wavelength division multiplexing (WDM) set and the plurality of optical transceivers of the second type are configured to transmit light at a second WDM set.

14. The optical network of claim 11, wherein the at least one characteristic by which the first type differs from the second type comprises a polarization of the light transmitted by the respective optical transceiver such that the plurality of optical transceivers of the first type are configured to transmit light with a first polarization and the plurality of optical transceivers of the second type are configured to transmit light with a second polarization.

15. The optical network of claim 11, wherein the at least one characteristic by which the first type differs from the second type comprises a time slot in which the light is transmitted by the respective optical transceiver such that the plurality of optical transceivers of the first type are configured to transmit light in a first time slot and the plurality of optical transceivers of the second type are configured to transmit light in a second time slot.

16. The optical network of claim 11, wherein the plurality of optical transceivers of each node are integrated on a common photonic integrated circuit (PIC).

17. The optical network of claim 11, wherein each node is coupled to at least one graphical processing unit (GPU).

18. A method of forming an optical network, comprising:

obtaining a plurality of nodes, wherein each node of the plurality of nodes comprises a plurality of optical transceivers of a first type and a plurality of optical transceivers of a second type, wherein the first type differs from the second type in at least one characteristic of light transmitted by the respective optical transceiver, wherein the optical transceivers of the first type are in equal numbers across the plurality of nodes and the optical transceivers of the second type are in equal numbers across the plurality of nodes; and connecting the plurality of nodes with one another with a plurality of optical channels supporting bidirectional communication between the connected nodes, wherein the connecting comprises coupling optical transceivers of the first type with optical transceivers of the second type.

19. The method of claim 18, wherein connecting the plurality of nodes with one another with the plurality of optical channels comprises connecting the plurality of nodes with one another with the plurality of optical channels in an all-to-all configuration.

20. The method of claim 18, further comprising connecting each node to a graphical processing unit (GPU).

* * * * *